United States Patent [19]

Nakagawa et al.

[11] 4,008,167

[45] * Feb. 15, 1977

[54] FOAMING BLEACHING COMPOSITION

[75] Inventors: Yunosuke Nakagawa, Koshigaya; Masaaki Nishimura; Koitsu Sato, both of Funabashi, all of Japan

[73] Assignee: Kao Soap Co., Ltd., Tokyo, Japan

[ * ] Notice: The portion of the term of this patent subsequent to Apr. 27, 1993, has been disclaimed.

[22] Filed: Mar. 5, 1975

[21] Appl. No.: 555,573

[30] Foreign Application Priority Data

Mar. 18, 1974 Japan .............................. 49-30791

[52] U.S. Cl. ................................ 252/99; 252/103; 252/186; 423/582
[51] Int. Cl.² .......................................... C11D 7/56
[58] Field of Search .................... 252/99, 186, 103; 423/582

[56] References Cited

UNITED STATES PATENTS

| | | |
|---|---|---|
| 2,362,401 | 11/1944 | Reichert et al. ................. 252/99 X |
| 2,955,905 | 10/1960 | Davies et al. ........................ 252/99 |
| 3,532,634 | 10/1970 | Woods ................................. 252/95 |
| 3,715,184 | 2/1973 | Kuhling et al. ................. 252/99 X |
| 3,773,678 | 11/1973 | Munday ............................. 252/186 |

Primary Examiner—Mayer Weinblatt
Attorney, Agent, or Firm—Woodhams, Blanchard and Flynn

[57] ABSTRACT

A bleaching composition is disclosed characterized by containing (a) sodium percarbonate which has been heated at a temperature of 75° to 135° C for a time ranging from 5 to 30 minutes at 135° C to 2 to 6 hours at 75° C and (b) an activating agent for the sodium percarbonate.

12 Claims, No Drawings ing treated according to the invention is not reduced but is in fact enhanced even if it is stored as a mixture with the activating agent. The reason therefor has not yet been clarified.

FOAMING BLEACHING COMPOSITION

BACKGROUND OF THE INVENTION

Field of the Invention

This invention relates to a foamable sodium percarbonate bleaching agent composition which foams vigorously in water and which has an excellent solution velocity and a long shelf life.

As clothes bleaching agents, there are known the oxygen-type and the chlorine-type bleaching agents. In Japan, chlorine-type bleaching agents which exhibit an excellent bleaching effect at a low temperature have come into general use. The chlorine-type bleaching agents are effective on cellulosic fibers but cannot be used for synthetic fibers, because they cause yellow stain damage to synthetic fibers and they decolorize dyed clothing made from synthetic fibers.

On the other hand, the oxygen-type bleaching agents have the advantages that they can be used for treating most synthetic fibers as well as cellulosic fibers, and they can be used safely for dyed clothes because of their mild bleaching action.

However, the oxygen-type bleaching agents, a typical example of which is sodium percarbonate, have only a poor solution velocity at low temperature and therefore a sufficient bleaching power cannot be obtained at such temperature. Further, because of their poor solution velocity the remaining undissolved particles of the oxygen-type bleaching agent adhere to the fibers to form local high concentration bleaching zones whereat the fibers are damaged and partial decolorization is caused. Thus, the oxygen-type bleaching agents, which are effective in clothes washing at a high temperature of above 60° C, have not been used up to the present in Japan in those situations wherein washing is generally effected at a low temperature of about 20° C. In view of these circumstances, improvement in the solution velocity of oxygen-type bleaching agents has been desired.

In bleaching agents containing sodium percarbonate as an active ingredient, a so-called "activating agent" is incorporated to increase the bleaching power of sodium percarbonate, because of its poor bleaching power at a low temperature. However, if an activating agent is incorporated in sodium percarbonate, the stability of the sodium percarbonate is impaired seriously. Particularly, if the bleaching agent is stored for a long period of time as in domestic usage, decomposition of the sodium percarbonate occurs thereby reducing the amount of available oxygen, whereby the composition eventually becomes unsuitable for practical use. Further, a caking problem occurs, and the decomposition of the sodium percarbonate causes an increase in the volume of the product and the container is thereby expanded or broken.

SUMMARY OF THE INVENTION

The invention eliminates the above noted disadvantages of oxygen bleaching agents, and provides a means whereby the solution velocity of sodium percarbonate is improved markedly and it becomes foamable. We have discovered that by heating sodium percarbonate at a temperature of 75° to 135° C for a predetermined period of time, as will be described below, the solution velocity and foaming property of sodium percarbonate in aqueous solutions is greatly and unexpectedly increased.

This invention provides a foamable bleaching composition having a long shelf life and a high solution velocity at a low teemperature. The bleaching composition contains sodium percarbonate which has been heated at a temperature of 75° to 135° C for a time period ranging from 5 to 30 minutes at 135° C to 2 to 6 hours at 75° C. The composition also contains admixed therein an activating agent for the sodium percarbonate in an amount of from 5 to 200 weight percent, preferably 10 to 100 weight percent, based on the weight of the sodium percarbonate.

If a heating temperature below 75° C is employed, the solution velocity of the sodium percarbonate is not improved. A heating temperature above 135° C is also disadvantageous, because the bleaching power of the sodium percarbonate is reduced and the desired foaming property substantially disappears.

The length of the heating time needed for imparting the foaming property to sodium percarbonate varies depending upon the heating temperature. Generally, the lower the temperature, the longer is the heating time required or, in other words, the higher the temperature, the shorter is the heating time. At 75° C, a heating time of 2 to 6 hours is required. At 135° C, a heating time of 5 to 30 minutes is required. Under these conditions the reduction in the available oxygen content of the sodium percarbonate caused by the heating is 5 to 30 weight percent. When the heating time is shorter than the above-stated range, the resulting sodium percarbonate is not foamable. On the other hand, when the heating time is longer than the above-stated range, the foaming property is lost, and, further the bleaching power thereof is reduced. This is considered to be owing to the conversion of a substantial proportion or all of the sodium percarbonate to sodium carbonate.

When heating temperatures between the limits of 75° C and 135° C are used, the heating time is determined by interpolation. For a general purpose household bleaching agent, sodium percarbonate which has been heated at 100° to 110° C for about 1.5 hours is preferred.

Sodium percarbonate of this invention which is treated with heat is the same substance as that which has not been heated. The difference of the two, however, is in that the treatment of heat has sodium percarbonate hold oxygen molecules in its crystal lattice. And the sodium percarbonate releases the oxygen molecules in order to foam when it is based in water.

The heated sodium percarbonate was analysed with Raman spectrometry, which showed that the heated sodium percarbonate has a characteristic absorption at the wave number of 1550 $cm^{-1}$ corresponding to that of oxygen molecule, but sodium percarbonate not heated was not found to have the same absorption.

In general, if non-heat-treated sodium percarbonate is stored in the form of an admixture thereof with an activating agent, the shelf life of the composition is reduced greatly, the sodium percarbonate is decomposed and the storage thereof for a long period of time is difficult. In the sodium percarbonate which has been subjected to the heat treatment, according to the invention as described above, a partial decomposition has already occurred and, therefore, it would be expected that the decomposition would be further promoted by the addition of the activating agent. However, surprisingly, the stability of the sodium percarbonate heat-treated according to the present invention is improved, and a bleaching composition having a powerful bleaching action and long shelf life can be obtained by the addition of an activating agent thereto.

In addition, when sodium percarbonate which has been heated according to this invention is used, no caking of the powder occurs, and excellent flow of the powder is exhibited.

Preferred activating agents for sodium percarbonate used in the present invention are esters of polyhydric alcohols such as glucose pentaacetate and sorbitol hexaacetate, sodium acetoxybenzene sulfonate, and N-acyl compounds such as tetraacetyl glycoluril and tetraacetyl ethylenediamine. Further, organic acid anhydrides such as succinic anhydride and phthalic anhydride can also be used. The effect of these activating agents in improving the stability of the peroxide is not exhibited with other peroxides such as sodium perborate but rather is unique to heat-treated sodium percarbonate, prepared according to the present invention.

The bleaching composition of the present invention can be mixed, if necessary or desired, with additives such as water-soluble inorganic salts such as sodium sulfate, sodium carbonate and sodium silicate. Further, the composition can be transformed to a bleaching detergent composition by adding thereto, alone or in addition to the said salts, an anionic surfactant, nonionic surfactant or amphoteric surfactant of the type conventionally used for household clothes washing purposes.

A similar improved effect can be obtained by adding the activating agent and other optional additives to sodium percarbonate and then subjecting the resulting composition to the said heat treatment at 75° to 135°C.

The proportion of heat treated percarbonate plus activating agent can be in the range of 10 to 100 percent by weight, based on the total weight of the compositions containing the additives.

The aqueous bleaching solution useful for household laundry purposes for bleaching clothes is prepared by dissolving the bleaching composition in water in an amount such that the concentration of the heat-treated sodium percarbonate is from 0.02 to 4 weight percent, based on the aqueous bleaching solution. The solution must be prepared just before its usage.

The heat-treated sodium percarbonate, according to the invention, is altered by the heat treatment so as to have an improved solution velocity and foaming property in comparison with the non-heat-treated sodium percarbonate. It has not been possible thus far to ascertain the physical and/or chemical changes that take place during the heat treatment because the fragility of this compound complicates identification of various phases of the system $Na_2CO_3$—$H_2O_2$—$H_2O$.

The present invention will be further described by reference to the following illustrative examples.

EXAMPLE 1

The effects of various heat treatments of sodium percarbonate ($2Na_2CO_3 \cdot 3H_2O_2$) on its solution velocity were examined.

A powdery mixture (10 to 100 mesh) comprising 40 parts by weight of sodium percarbonate heated at various temperatures for various periods and 10 parts by weight of glucose pentaacetate are prepared. 300 ml. of city water are placed in a 500 ml. beaker and then 3 g samples of the respective compositions are added with slow stirring at room temperature. The time required until disappearance of the particles is determined and the state of foaming is observed. The results are given in Table 1.

Table 1

| Sodium percarbonate treatment | | | |
|---|---|---|---|
| Heating temp. (°C) | Heating time (hr.) | Solution time (sec.) | Foaming Property |
| 65° | 1.5 | 240 | No foaming (control) |
| 80 | 1.5 | 70 | Foaming(control) |
| 105 | 1.5 | 15 | Vigorous foaming (invention) |
| 130 | 1.5 | 200 | Substantially no foaming (control) |
| 150 | 1.5 | 240 | No foaming (control) |
| 80 | 4 | 20 | Vigorous foaming (invention) |
| 80 | 0.5 | 120 | Slight foaming (control) |
| 130 | 0.17 | 15 | Vigorous foaming (invention) |
| Untreated | — | 240 | No foaming (control) |

EXAMPLE 2

| | |
|---|---|
| Sodium percarbonate | 45 parts by weight |
| Glucose pentaacetate | 10 |
| Sodium tripolyphosphate | 30 |
| Sodium sulfate | 15 |

Bleaching agents of the above composition are prepared by using various sodium percarbonates which have not been heat-treated or which have been heat-treated under various heating conditions, and the shelf lives thereof are examined. The heat treatment is effected by placing 50 g of sodium percarbonate in a 1 liter glass beaker placed in an electric constant temperature bath at 125° C for 15, 25 or 30 minutes.

The bleaching agents are stored in a closed vessel at 40° C for 30 days. The amounts of available oxygen before the storage and after 30 days storage are measured. The shelf life can be estimated from the amount of remaining available oxygen, the results were as shown below in Table II.

Table II

| Sodium percarbonate (available oxygen before storage) | Amount of remaining available oxygen (% of original, after 30 days storage) |
|---|---|
| Untreated (available oxygen: 14.3%) | 82.4 % |
| Heated for 15 mins. (available oxygen: 13.7%) | 93.8 % |
| Heated for 25 mins (available oxygen: 12.5%) | 95.0 % |
| Heated for 30 mins. (available oxygen: 95.1%) | 95.1 % |

These data illustrate that a longer shelf life is obtained by using heat-treated sodium percarbonate.

EXAMPLE 3

A powdery bleaching agent is prepared comprising 90 parts by weight of sodium percarbonates which have not been treated or which have been heat-treated under the same conditions as described in Example 2, and 10 parts by weight of tetraacetyl glycoluril as activating agent. The bleaching agent is stored in a closed vessel at 40° C for 10 days and the state of the powder after the storage and its storage stability are examined to obtain the following results given in Table III.

TABLE III

| Sodium percarbonate (available oxygen before before storage | State of Powder | Amount of remaining available oxygen (% of original) |
|---|---|---|
| Untreated (available oxygen: 14.3%) | Caking is caused | 95.2% |
| Heated for 15 mins. (availble oxygen: 13.5%) | Excellent flowability | 99.2% |
| Heated for 25 mins. (available oxygen: 12.6%) | Excellent flowability | 100.0 |
| Heated for 30 mins. (available oxygen: 12.0%) | Excellent flowability | 98.5 |

EXAMPLE 4

| Sodium percarbonate | 30 wt. % |
|---|---|
| Sorbitol hexaacetate | 10 |
| Sodium tripolyphosphate | 25 |
| Sodium sulfate | 25 |
| Oxyethylene/oxypropylene block polymer (average molecular weight: about 8,000) | 10 |

A powdery bleaching agent of the above composition was prepared and stored in a sealed polyethylene bottle at room temperature. When sodium percarbonate which has been heat-treated at 105° C for 1.5 hours is used, the bleaching agent has an excellent flowability, the vessel is not expanded, and 92 percent of the available oxygen remained after 6 months storage. When non-heat-treated sodium percarbonate is used, the vessel is expanded after 3 months, the flowability of the powder is poor even if the vessel is turned upside down, and the available oxygen measured after 6 months is 28 percent.

The embodiments of the invention in which an exclusive property or privilege is claimed are defined as follows:

1. A foamable bleaching composition consisting essentially of from 10 to 100 percent by weight of a mixture of
    a. heat treated sodium percarbonate which has been heated at a temperature in the range of 75° to 135° C for a heating time ranging from (1) 2 to 6 hours at 75° C to (2) from 5 to 30 minutes at 135° C, and
    b. an activating agent selected from the group consisting of glucose pentaacetate, sorbitol hexaacetate, sodium acetoxybenzene sulfonate, tetraacetyl glycoluril, tetraacetyl ethylenediamine, succinic anhydride and phthalic anhydride, said mixture containing from 5 to 200 weight percent of (b), based on the weight of (a), and the balance of said composition is one or more water-soluble inorganic builder salts, or an anionic, nonionic or amphoteric household clothes washing surfactant, or a mixture of said salts and said surfactants.

2. A composition according to claim 1 consisting essentially of about 90 parts by weight of said heat treated sodium percarbonate and about 10 parts of tetraacetyl glycoluril.

3. A composition according to claim 1 consisting essentially of about 45 parts of said heat treated sodium percarbonate, about 10 parts of glucose pentaacetate, about 30 parts of sodium tripolyphosphate and about 15 parts of sodium sulfate.

4. A composition according to claim 1 consisting essentially of about 30 wt.% of said heat treated sodium percarbonate, about 10 wt.% of sorbitol hexaacetate, about 25 wt.% of sodium tripolyphosphate, about 25 wt.% of sodium sulfate, and about 10 wt.% of oxyethylene/oxypropylene block polymer of average molecular weight of about 8000.

5. A composition according to claim 1 consisting essentially of about 40 parts by weight of said heat treated sodium percarbonate and about 10 parts by weight of glucose pentacetate.

6. A composition according to claim 1 in which said mixture contains from 10 to 100 weight percent of (b), based on the weight of (a).

7. A composition according to claim 1 in which said heat treated sodium percarbonate has a characteristic absorption at 1550 $cm^{-1}$.

8. A method of preparing a foamable bleaching composition possessing an improved shelf life which comprises heating sodium percarbonate at a temperature in the range of 75° to 135° C for a heating time ranging from (1) 2 to 6 hours at 75° C to (2) 5 to 30 minutes at 135° C, and admixing therewith from 5 to 200 weight percent, based on the weight of said sodium percarbonate, of an activating agent selected from the group consisting of glucose pentaacetate, sorbitol hexaacetate, sodium acetoxybenzene sulfonate, tetraacetyl glycoluril, tetraacetyl ethylenediamine, succinic anhydride and phthalic anhydride.

9. A method according to claim 8 wherein said heat treated sodium percarbonate and said activating agent are also mixed with one or more water-soluble inorganic builder salts, or an anionic, nonionic or amphoteric household clothes washing surfactant, or a mixture of said salts and said surfactants.

10. The method of claim 8 in which the sodium percarbonate is heated in the range of 100° to 110° C for about 1.5 hours.

11. The method of claim 9 in which said salt, or said surfactant or mixture thereof is added to the sodium percarbonate prior to the heating step.

12. A process for preparing an aqueous bleaching solution which comprises dissolving in water, just before its usage, the bleaching composition as claimed in claim 1 in an amount such that the concentration of said sodium percarbonate in the aqueous bleaching solution is from 0.02 to 4 weight percent, based on the weight of the solution.

* * * * *